US009553323B2

(12) United States Patent
Isom et al.

(10) Patent No.: US 9,553,323 B2
(45) Date of Patent: Jan. 24, 2017

(54) FLUIDIZED BED CONTAMINANT SEPARATOR AND WATER-CONTROL LOOP FOR A FUEL REACTANT STREAM OF A FUEL CELL

(75) Inventors: Joshua D. Isom, South Windsor, CT (US); Leslie L. VanDine, Manchester, CT (US); Derek W. Hildreth, Manchester, CT (US); John L. Preston, Hebron, CT (US); Paul R. Hanrahan, Farmington, CT (US); Lynn Reni, Vernon, CT (US)

(73) Assignee: DOOSAN FUEL CELL AMERICA, INC., Atlanta, GA (US)

( * ) Notice: Subject to any disclaimer, the term of this patent is extended or adjusted under 35 U.S.C. 154(b) by 740 days.

(21) Appl. No.: 13/263,148

(22) PCT Filed: Apr. 27, 2009

(86) PCT No.: PCT/US2009/002566
§ 371 (c)(1),
(2), (4) Date: Oct. 6, 2011

(87) PCT Pub. No.: WO2010/126460
PCT Pub. Date: Nov. 4, 2010

(65) Prior Publication Data
US 2012/0034536 A1 Feb. 9, 2012

(51) Int. Cl.
*H01M 8/06* (2016.01)
*B01D 53/14* (2006.01)
(Continued)

(52) U.S. Cl.
CPC ........ *H01M 8/0662* (2013.01); *B01D 53/1412* (2013.01); *B01D 53/1425* (2013.01);
(Continued)

(58) Field of Classification Search
CPC . B01D 53/1412; B01D 53/1425; B01D 53/18; B01D 2257/406; C01B 3/32; C01B 2203/0283; C01B 2203/066; C01B 2203/0205; H01M 8/04014; H01M 8/0662; H01M 8/0618; Y02E 60/50
(Continued)

(56) References Cited

U.S. PATENT DOCUMENTS

2009/0246573 A1* 10/2009 Grasso .................. B01D 53/58
429/412

* cited by examiner

*Primary Examiner* — Gary Harris
(74) *Attorney, Agent, or Firm* — Carlson, Gaskey & Olds

(57) ABSTRACT

A fluidized contaminant separator and water-control loop (10) decontaminates a fuel reactant stream of a fuel cell (12). Water passes over surfaces of an ammonia dissolving media (61) within a fluidized bed (62) while the fuel reactant stream simultaneously passes over the surfaces to dissolve contaminants from the fuel reactant stream into a separated contaminant and water stream. A fuel-control heat exchanger (57) upstream from the scrubber (58) removes heat from the fuel stream. A water-control loop (78) directs flow of the separated contaminants and water stream from an accumulator (68) through an ion exchange bed (88) which removes contaminants from the stream. Decontaminated water is directed back into the scrubber (58) to flow through the fluidized bed (62). Separating contaminants from the fuel reactant stream and then isolating and concentrating the separated contaminants within the ion exchange material (88) minimizes costs and maintenance requirements.

11 Claims, 2 Drawing Sheets

(51) Int. Cl.
*B01D 53/18* (2006.01)
*C01B 3/32* (2006.01)
*H01M 8/04* (2016.01)

(52) U.S. Cl.
CPC ............... B01D 53/18 (2013.01); C01B 3/32 (2013.01); H01M 8/04014 (2013.01); *B01D 2257/406* (2013.01); *C01B 2203/0205* (2013.01); *C01B 2203/0283* (2013.01); *C01B 2203/066* (2013.01); *H01M 8/0618* (2013.01); *Y02E 60/50* (2013.01)

(58) Field of Classification Search
USPC ........................................................ 429/410
See application file for complete search history.

FLUIDIZED BED CONTAMINANT SEPARATOR AND WATER-CONTROL LOOP FOR A FUEL REACTANT STREAM OF A FUEL CELL

TECHNICAL FIELD

The present disclosure relates to fuel cells that are suited for usage in transportation vehicles, portable power plants, or as stationary power plants, and the disclosure especially relates to a contaminant removal system for efficiently removing contaminants such as ammonia and particulates from a fuel reactant stream passing into a fuel cell.

BACKGROUND ART

Fuel cells are well known and are commonly used to produce electrical current from hydrogen containing reducing fluid fuel and oxygen containing oxidant reactant streams to power electrical apparatus such as transportation vehicles. In fuel cells of the prior art, it is well known that fuel is produced by a reformer and the resulting fuel is referred to as a reformate fuel that flows from the reformer through a fuel reactant stream inlet line into an anode flow field of the fuel cell. As is well known an oxygen rich reactant simultaneously flows through a cathode flow field of the fuel cell to produce electricity. Unfortunately, such reformate fuels frequently contain contaminants especially ammonia. The presence of ammonia in the reformate fuel stream is detrimental to the performance of the fuel cell. It is understood that ammonia is a common byproduct of the reforming process and although the reforming process is designed to minimize formation of ammonia, it is common that low levels of ammonia are present in the reformate fuel. In steam reformers, ammonia formation results from nitrogen that is present in natural gas that is fed into the reformer to be reformed into the fuel. Typically nitrogen content is between 2-3 percent but may reach as high as 15 percent in some parts of the world. Known fuel cells that include phosphoric acid as an electrolyte cannot achieve a desired 10 year life with greater than 1-2 percent nitrogen within the natural gas. Additionally, in the case of auto thermal or partial oxidation reformers, nitrogen can also be introduced when air is used as the oxygen source for the reforming process.

Many efforts have been undertaken to remove ammonia and other contaminants from fuel reactant streams of fuel cells. For example, U.S. Pat. No. 4,801,356 that issued on Jan. 31, 1989, to Grasso disclosed an elaborate system for removal of ammonia from fuel cell power plant water. The system of Grasso includes passing cooling water that had been used to cool the reformate fuel through a first steam stripper and a second steam stripper to remove the ammonia contaminant. Although effective, the system of Grasso requires complex and costly strippers and processing of a large volume of fuel cell coolant water.

More recently U.S. Pat. No. 6,376,114, that issued on Apr. 23, 2002 to Bonville, Jr. et al., disclosed another elaborate system for removing ammonia and other contaminants from reformate fuel. The system of Bonville, Jr. et al., includes alternatively a disposable ammonia scrubber, an ammonia scrubbing cool water bed and an ammonia stripping warm water bed, a pair of first and second regenerable scrubbers, or a single regenerable scrubber. Again, while effective the Bonville, Jr. et al system includes elaborate and costly components that require a high level of maintenance to operate the system. Other ammonia and related contaminant removal systems for fuel cells are known in the art. However, none of these provide for efficiently removing ammonia with minimal costs and minimal maintenance requirements. Most known ammonia contaminant removal systems require large components for processing a high volume of fluids, or require high frequency removal and replacement of contaminated filters and/or ion beds, etc.

Consequently, there is a need for a contaminant removal system for a fuel reactant stream that may be operated efficiently for a long period of time without high frequency maintenance.

SUMMARY

The disclosure is directed to a fluidized bed contaminant separator and water-control loop for a fuel reactant stream of a fuel cell. The fluidized bed contaminant separator is a separator scrubber secured in fluid communication with a fuel reactant inlet line of the fuel cell. The scrubber includes a fluidized bed of light weight, preferably high surface area medium, disbursed within a scrubber container. A water discharge is secured above the fluidized bed for discharging water to flow by gravity over the surface area of the medium. A fuel reactant discharge is secured below the fluidized bed for discharging the fuel reactant to flow upward from the fuel reactant discharge through the light weight medium, causing the bed to fluidize. A scrubber fuel outlet is defined within the scrubber container for directing the fuel reactant stream to flow from the scrubber container back into the fuel reactant inlet line and into the fuel cell. An accumulator is secured in fluid communication with the fluidized bed for accumulating water as a separated contaminant stream below the fluidized bed and the accumulator may consist of simply a water accumulation area in the scrubber container below the fluidized bed and the fuel reactant discharge. A fuel-control heat exchanger is secured in heat exchange relationship with the fuel reactant inlet line upstream of the separator scrubber for adding thermal energy to or removing thermal energy from the fuel reactant passing through the fuel reactant inlet line into the scrubber. The fluidized bed is also an excellent particulate removal device which will remove small particles such as copper particles from a shift converter used to process the fuel reactant stream. Such particles if not extracted from the fuel reactant stream could move into the fuel cell to poison components or plug passages within the fuel cell anode flow field. For purposes herein, the word "contaminant", such as in the phrase "separated contaminant stream" is to mean dissolved ammonia, as well as particulates separated from the fuel reactant stream within the separator scrubber.

A water-control loop is secured in fluid communication with the separator scrubber, and the water-control loop includes a loop conduit for directing a water stream out of the accumulator of the separator scrubber and eventually back into the separator scrubber. A water-control loop pump is secured in fluid communication with the loop conduit for pumping the water stream through the loop conduit. An ion exchange bed is secured in fluid communication with the loop conduit for directing flow of the separated contaminant stream through the ion exchange bed. A loop conduit return line is secured in fluid communication between an outlet of the ion exchange bed and a water inlet of the separator scrubber for directing flow of the de-contaminated water stream from the ion exchange bed back into the separator scrubber to be discharged through the water discharge over the fluidized bed. In an alternative embodiment there may be no fuel-control heat exchanger secured upstream of the separator scrubber. Instead, there may be a water-control heat exchanger secured in fluid communication with the water-control loop for adding or removing thermal energy from the system. In a further alternative, the ion exchange bed may utilize a cation-only exchange resin to selectively remove the ammonia so that dissolved carbon dioxide and carbonic acid anions are allowed to remain within the water leaving the cation-only ion exchange bed to acidify the water and thereby improve the ammonia removal performance of the scrubber.

The fluidized bed contaminant separator and water-control loop may also include a controller to sense the temperature and/or moisture content of the fuel reactant stream entering and/or leaving the separator scrubber, and to sense the level of water in the scrubber accumulator; to control the fuel reactant line heat exchanger in order to achieve optimal operating temperature of the scrubber; and, to control a water overflow valve to maintain optimal water level in the scrubber accumulator.

A major advantage of the preferred embodiment is that the thermal control function is separated from the contaminant removal function which permits more flexibility in designing the fluidized bed. By removing thermal energy from the fuel reactant stream prior to the stream entering the scrubber, the scrubber may contain light weight, low-melting temperature contact materials which can be easily fluidized. In addition, in sizing the water-control loop pump, a lower flow can be used because it is set only by contaminant removal requirements, not thermal control requirements. Also, the fluidized bed scrubber enhances contact between the fuel reactant stream and the separated contaminant water stream compared to less efficient scrubbers such as packed beds, etc. This enhances absorption of the ammonia contaminant, thereby permitting use of a much smaller separator scrubber container.

To achieve such performance with de-contamination systems of the prior art, either a much larger, more costly and more complicated scrubber and/or ion exchange bed would be required or replacement of an ion exchange bed or other contaminant isolation apparatus would be required at much more frequent intervals. The present disclosure isolates the contaminants within an ion exchange bed that is separated from all other power plant water systems, such as a fuel reformer system, so that only ammonia has to be removed from the water. Therefore, the contaminant removal system of the present disclosure achieves extremely efficient removal of contaminants within the fuel cell fuel reactant stream and also achieves maintenance of optimal temperature and moisture content of the fuel reactant stream.

Accordingly, it is a general purpose of the present disclosure to provide a fluidized bed contaminant separator and water-control loop for a fuel reactant stream of a fuel cell that overcomes deficiencies of the prior art.

It is a more specific purpose to provide a fluidized bed contaminant separator and water-control loop for a fuel reactant stream of a fuel cell that enhances removal of contaminants from, and maintenance of an optimal temperature and moisture content of, a fuel reactant stream of a fuel cell.

These and other purposes and advantages of the present fluidized bed contaminant separator and water-control loop for a fuel reactant stream of a fuel cell will become more readily apparent when the following description is read in conjunction with the accompanying drawings.

DESCRIPTION OF THE PREFERRED EMBODIMENTS

Figure 1:
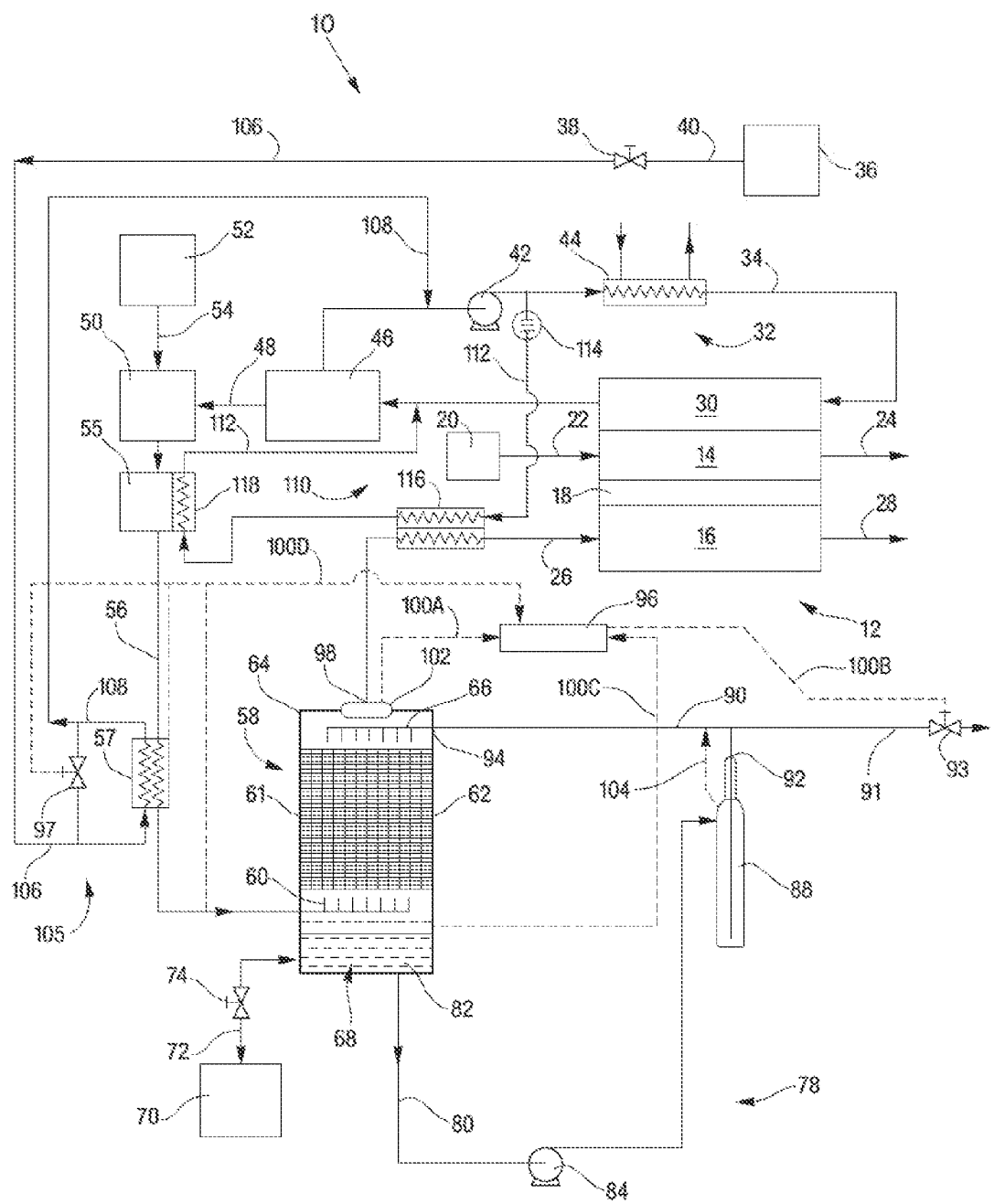
FIG. 1 is a simplified schematic representation of a fluidized bed contaminant separator and water-control loop of the present disclosure.

Referring to the drawings in detail, a fluidized bed contaminant separator and water-control loop for a fuel reactant stream of a fuel cell is shown in FIG. 1 and is generally designated by the reference numeral 10. A fuel cell 12 appropriate for the present disclosure includes a cathode flow field 14 and an anode flow field 16 secured to apposed sides of an electrolyte 18. The electrolyte 18 may be a phosphoric acid electrolyte, a proton exchange membrane ("PEM") electrolyte, or any electrolyte known in the art. An oxygen supply 20 delivers an oxygen containing reactant stream through an oxidant inlet 22 into and through the cathode flow field 14, and the oxygen reactant stream leaves the fuel cell 12 through a cathode vent 24. A hydrogen containing reducing fluid fuel is directed to flow through a fuel reactant inlet line 26 through the anode flow field 16 and out of the fuel cell 12 through anode vent 28.

The fuel cell 12 may also include a coolant plate 30 that has a water-based coolant circulating through the plate 30 by way of a coolant loop 32. The coolant loop 32 may include a coolant loop conduit 34 that directs the coolant through the coolant loop 32. A coolant supply 36 selectively directs the coolant through a coolant inlet valve 38 and coolant inlet line 40 into the coolant loop conduit 34. A coolant pump 42 is secured in fluid communication with the coolant loop conduit 34 for pumping the coolant through the coolant loop 32. A coolant loop heat exchanger 44 is secured in heat exchange relationship with the coolant loop conduit 34 to control a temperature of the coolant cycling through the coolant loop conduit 34. A steam separator 46 is secured in fluid communication with the coolant loop conduit 34 for separating steam from liquid coolant within the coolant loop conduit 34.

Steam is directed from the steam separator 46 through a steam line 48 into a reformer means 50 for reforming a hydrogen rich fuel, such as natural gas, into a reformate fuel containing hydrogen gas. A hydrogen containing fuel supply 52 directs the fuel through a fuel line 54 into the reformer 50. The fuel supply 52 may be a pressurized supply source, or may include pressurizing means for increasing a pressure of the fuel in a manner known in the art. The reformer 50 may be any reformer means known in the art for reforming hydrogen rich fluids into reformate fuels appropriate for use in fuel cells. The reformer 50 may be part of a fuel processing system (not shown) that also includes related components necessary for processing the hydrogen rich fuel into a reformate fuel appropriate for a fuel cell, such as de-sulfurizers, shift converters, burners, etc.

The reformate fuel leaves the reformer 50 and related components and the fuel may then also pass through a low temperature shift converter 55 and then through a first section 56 of the fuel reactant inlet line 26. Next, the fuel is directed through a fuel-control heat exchanger 57 secured in heat exchange relationship with the fuel reactant inlet line and then into a contaminant separator scrubber 58 to be discharged through a fuel reactant discharge 60 within the scrubber 58. The separator scrubber 58 includes an ammonia dissolving media 61 for dissolving ammonia from the reformate fuel into a liquid separated contaminant stream within the separator scrubber 58, such as a fluidized bed 62 consisting of a light weight high surface area medium disposed within a scrubber container 64. Alternative ammonia dissolving media 61 that may be utilized include smooth or dimpled balls made of polypropylene or other plastic or lightweight metal such as aluminum or thin walled stainless steel. Other fluidizable shapes made of these same materials may also be employed.

A water discharge 66 is secured above the fluidized bed 62 for discharging water from the discharge 66 to pass downward by gravity through the fluidized bed 62. The fuel discharge 60 is secured below the fluidized bed 62 so that the fuel discharged through the discharge 60 passes upward through the fluidized bed 62 as the water is flowing downward through the fluidized bed 62. As the gaseous fuel passes over and contacts the surface area of the fluidized bed 62, contaminants within the gaseous fuel are dissolved into solution within the water passing over the surface of the medium within the fluidized bed 62. An accumulator 68 is defined within the scrubber container 64 such as below the fuel reactant discharge 60 so that water passing downward through the fluidized bed 62 is accumulated within the accumulator 68.

A supply of fresh water 70 may be secured in fluid communication with the scrubber container 64 to direct water through a water inlet line 72 and water inlet valve 74 into the scrubber container 64 upon start up or to supplement the scrubber 58 with additional water during operation if a water balance is not maintained.

A water-control loop 78 is secured in fluid communication with the separator scrubber 58 by way of a loop conduit 80. The loop conduit 80 is secured to a water outlet 82 defined within the scrubber container 64 and in fluid communication with the water within the accumulator 68. The water-control loop 78 also includes a water-control pump means 84 for pumping a stream of water out of the separator scrubber 58 and through the loop 78. The water-control loop 78 also includes an ion exchange bed 88 secured in fluid communication with the loop conduit 80 for directing flow of the separated contaminant stream through the ion exchange bed 88 and for removing separated contaminants from the water in the contaminant stream within the bed 88. The water-control loop 78 also includes a loop conduit return line 90 secured in fluid communication between an outlet 92 of the ion exchange bed 88 and a water inlet 94 of the separator scrubber 58 for returning decontaminated water from the water-control loop 78 back into the separator scrubber 58 through the water discharge 66. The water-control loop 78 also includes a water discharge line 91 and water discharge valve 93 secured in fluid communication with the loop conduit 80 and the outlet 92 of the ion exchange bed 88, for directing excess water out of the water-control loop 78. The water-control loop 78 may also include a gas vent by-pass line 104 secured in fluid communication between the ion exchange bed 88 to provide an escape conduit for any accumulated gasses from the bed 88 back into the loop conduit return line 90. Such accumulated gases within the ion exchange bed 88 may disrupt efficient operation of the ion exchange bed 88

The ion exchange bed 88 may be any ion exchange means known in the art for removing contaminants from liquid streams, such as a bed including a cation exchange resin, and more specifically a hydrogen form cation exchange bed would be preferred for removal of ammonia.

The separator scrubber 58 and water-control loop 78 may also include a controller means 96 for sensing information such as a temperature and/or a moisture content of the fuel reactant stream entering or leaving the scrubber 58. The controller means 96 may be designed for sensing such temperature, water level, and/or moisture information and communicating that information by way of communication lines, such as electric wires, radio transmissions, optical fibers or any signal communication means capable of achieving those functions, such as microprocessors, computers and the like. The sensed information may be utilized by the controller 96 to control a fuel-control heat exchanger control valve 97 and/or the water discharge valve 93. Control lines for transfer of sensed information and control information to and from the controller 96 are represented in FIG. 1 by hatched lines 100A, 100B, 100C and 100D. Such controller means 96 may include computers as well as electromechanical switches and/or manual control of the water discharge valve 93 and/or fuel-control heat exchanger control valve 97 in response to sensed temperature, water level, and/or moisture information at the scrubber fuel outlet 98. It is known that the solubility of ammonia in water increases with decreasing water temperatures. Therefore, the controller means 96 may be used to adjust the temperature of the fuel stream entering the scrubber 58 and thereby the water-control loop 78, as well as the water being discharged through the water discharge 66, to thereby adjust the amount of ammonia dissolved into the water. This effectively increases or decreases the decontamination of the fuel reactant stream.

The scrubber 58 may also include a mist eliminator 102 adjacent the scrubber fuel outlet 98 for eliminating movement of any water droplets along with the fuel reactant stream. The mist eliminator 102 may be any mist eliminator for achieving such a function, such as steel-wool, etc. As shown in FIG. 1, the separator scrubber 58 is configured so that the scrubber fuel outlet 98 is positioned above the ammonia dissolving media 61 and the fuel discharge 60 is positioned below the ammonia dissolving media 61. Therefore, the scrubber fuel outlet 98 directs flow of the fuel reactant stream out of the separator scrubber 58 after it has passed through the ammonia dissolving media 61.

The fluidized bed 62 may contain any light weight high surface area medium capable of being fluidized for use in scrubbers for removing contaminants by way of flow of liquid over the surface area of the medium. Examples of such high surface area media that may be used in the fluidized bed include hollow spheres, hollow ellipsoidal elements, or hollow shapes with indentations to collect water and increase tumble velocity, etc. which can be made from any light weight material such as plastic.

The separator scrubber 58 and water-control loop 78 are shown in FIG. 1 as down-stream, between the reformer means and the anode flow field 16 secured to the fuel reactant inlet line 26. It is pointed out however, that the separator scrubber 58 and water-control loop 78 may also be positioned anywhere between a component of the reformer means that generates ammonia or any contaminant and the anode flow field 16 so that some components, such as the low temperature shift converter 55, may be secured between the scrubber 58 and the anode flow field 16, depending upon a variety of specific factors for a particular fuel cell 12.

In order to enhance thermal efficiency of the fluidized bed contaminant separator and water-control loop 10, the water-based coolant circulating through the coolant loop 32 may be directed to flow from a cool portion of the coolant loop 32, such as downstream from the coolant heat exchanger 44 and upstream from the fuel cell 12, for example at the coolant inlet line 40, through a fuel-control heat exchanger coolant loop 105 that includes a feed line 106 to the fuel-control heat exchanger 57, as shown in FIG. 1. This relatively cool water-based coolant then removes thermal energy from the fuel passing through the heat exchanger 57. The fuel-control heat exchanger coolant loop 105 then directs the heated water-based coolant through a fuel-control heat exchanger return line 108 back to the coolant loop 32. Optionally, the fuel control heat exchanger control valve 97 may direct all or some of the water-based coolant to by-pass the fuel control heat exchanger 57 by directing the coolant from the feed line 106 into the return line 108. Preferably, the return line 108 directs the heated coolant into the coolant loop 32 at portion of the coolant loop 32 wherein the acquired heat is not detrimental to operation of the fuel cell 12, such as upstream of the coolant loop pump 42 and downstream from the fuel cell 12. The coolant inlet valve 38 may be secured to the fuel-control heat exchanger feed line 106 (as shown in FIG. 1) to control flow of the coolant to the fuel-control heat exchanger 57. The coolant inlet valve 38 may also be secured in communication with the controller means 96 to control operation of the valve 38 and fuel-control heat exchanger loop 105. By capturing the excess thermal energy in the fuel-control heat exchanger 57 and directing it to the coolant loop 32 having an operating coolant heat exchanger 44, the fuel-control heat exchanger loop 105 substantially enhances thermal efficiency of the fluidized bed contaminant separator and water-control loop 10.

The fluidized bed contaminant separator and water-control loop 10 may also include a scrubber outlet gas re-heater loop 110 shown in FIG. 1. The scrubber outlet gas re-heater loop 110 directs flow of a portion of the water-based coolant from the coolant loop 32 downstream from the coolant pump 42 and upstream from the coolant loop heat exchanger 44 through a gas re-heater loop conduit 112. A fixed flow orifice 114 may be secured to the gas re-heated loop conduit 112 to control a rate of flow of the coolant through the gas re-heater loop conduit 112. The conduit 112 directs the coolant into a scrubber outlet gas heat exchanger 116 which is a component of the outlet gas re-heater loop 110. Because the coolant is directed into the gas re-heater loop conduit 112 upstream from the coolant loop heat exchanger 44, the coolant is very hot. Within the scrubber outlet gas heat exchanger 116 the coolant passes in heat exchange relationship with the fuel passing within the fuel inlet line 26 between the separator scrubber 58 and the anode fuel cell 12, thereby heating the fuel. When the decontaminated fuel passes through the scrubber fuel outlet 98 out of the scrubber separator 58 it is saturated with water. By heating the fuel prior to the fuel passing into the fuel cell 12 and the anode flow field 16, the scrubber gas re-heater loop 110 substantially raises the temperature of the fuel to minimize condensation of the water out of the fuel within the anode flow field 16, to thereby avoid liquid water interrupting flow of the fuel through the fuel cell 12 and/or to otherwise eliminate damage to the fuel cell by condensed water in the fuel.

The scrubber outlet gas re-heater loop 110 then directs flow of the slightly cooled coolant from the scrubber outlet gas heat exchanger 116 through the gas re-heater loop conduit 112 into a shift converter heat exchanger 118, which may be another component of the outlet gas re-heater loop 110. The shift converter heat exchanger 118 is secured in heat exchange relationship With the fuel passing through the low temperature shift converter 55 to cool the shift converter 55. The scrubber outlet gas re-heater loop 110 then directs flow of the coolant, which may then be a mixture of steam and water, from the shift converter heat exchanger 118 through the gas re-heater loop conduit 112 back into the coolant loop 32 at a location in the coolant loop 32 that may be upstream from the coolant pump 42 and may also be upstream from the steam separator 46.

It can be seen that the scrubber gas re-heater loop 110 provides for pre-cooling the coolant in the outlet gas re-heater heat exchanger 116 to thereby improve the cooling function of the coolant for the low temperature shift converter 55, while also protecting the fuel cell 12 and the anode flow field 16 from water condensation. The scrubber gas re-heater loop 110 eliminates any need for an electric heater (not shown) to re-heat the fuel which would increase parasitic power and thereby reduce the efficiency of the fuel cell power plant 10. Similarly, the scrubber gas re-heater loop 110 is much more compact and less costly than using a regenerative heat exchanger (not shown) to re-heat the fuel.

Figure 2:
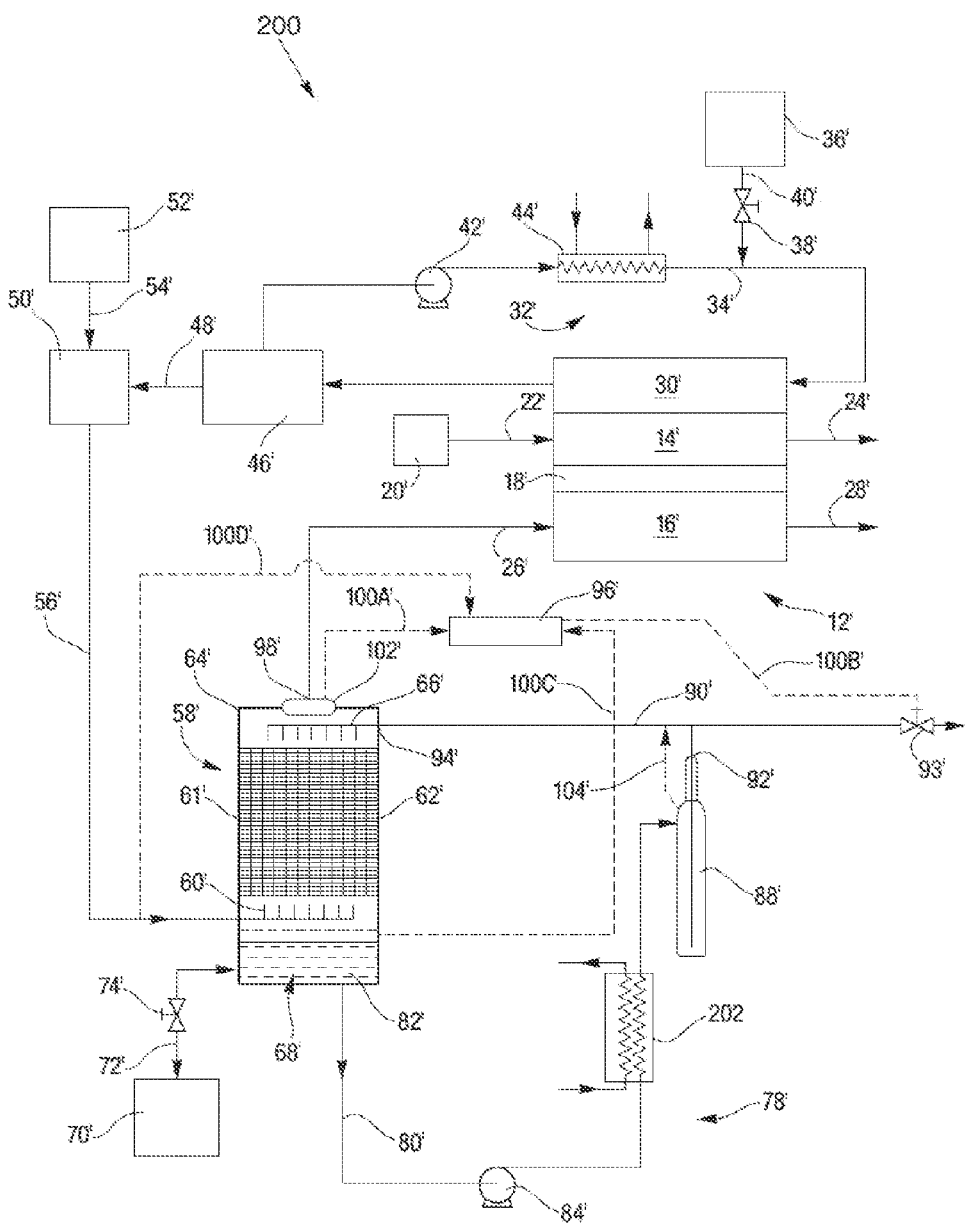
FIG. 2 is a simplified schematic representation of an alternative embodiment of a fluidized bed contaminant separator and water-control loop of the present disclosure.

FIG. 2 shows an alternative embodiment 200 of the present disclosure. (In FIG. 2, components that are virtually identical to the components shown in FIG. 1 are associated with primes of the same reference numerals as those utilized in FIG. 1. For example, the fuel cell 12 of FIG. 1 is shown in FIG. 2 as a fuel cell with reference numeral 12'.) In the FIG. 2 embodiment 200, the fuel-control heat exchanger 57 of the FIG. 1 embodiment is eliminated. Instead, a water-control heat exchanger 202 is secured in heat exchange relationship with the loop conduit 80' and is secured to the loop conduit 80' upstream from the ion exchange bed 88'. The heat exchanger 202 may be used for heating or cooling the water stream within the loop conduit 80'. The water-control heat exchanger 202 may be configured and/or operated to transfer thermal energy with the water stream to thereby maintain an optimal temperature of the water passing through the water-control loop 78' to thereby produce a desired temperature and dew point of the reactant fuel stream passing through and leaving the separator scrubber 58'. The water-control loop 78' also includes a loop conduit return line 90' secured in fluid communication between an outlet 92' of the ion bed 88' and a water inlet 94' of the separator scrubber 58' for returning the water stream from the water-control loop 78' back into the separator scrubber 58' through the water discharge 66'.

The FIG. 2 embodiment 200 includes the fluidized bed 62' of the FIG. 1 embodiment 10. However, the FIG. 2 embodiment anticipates that reformate fuel stream within the first section 56' of the hydrogen inlet line 26' may or may not need cooling. For example, cooling may be achieved by other methods such as evaporation of water in the separator scrubber 58' and/or apparatus. Additionally, the fluidized bed 62' contact materials may be high-temperature, light weight materials capable of being fluidized while being subject to a very high temperature reformate fuel reactant stream, so that no heat removal method and/or apparatus is required upstream of the separator scrubber 58'.

By first separating the ammonia or other contaminants, within the separator scrubber 58, 58' from the fuel reactant stream within the inlet line 26, 26', the FIG. 1 first embodiment 10 and the FIG. 2 alternative embodiment 200, both achieve substantial efficiencies over known art. As recited above, maintenance intervals for replacement of ion exchange material with the ion exchange bed 88, 88', or service thereof to remove contaminants within the ion exchange bed 88, 88', may be extended for substantial durations to minimize maintenance costs. In particular, where the ammonia contamination level of a fuel source is known, the ion exchange bed 88, 88' may be selected to have a contaminant removal capacity such that the ion exchange bed 88, 88' may only have to be serviced at a predetermined interval, such as once per year.

Additionally, because the contaminant removal process of the present disclosure is essentially a two-step process including first separating out the contaminants from the fuel reactant stream within the scrubber 58, 58' and then isolating and concentrating them within the ion exchange bed 88, 88', interruption in the flow of the fuel through the fluidized bed 62, 62' provides only a very modest pressure drop. Because there is such a modest pressure drop, the costs and complexities of delivering the fuel from the fuel supply 52, 52' through the fuel cell 12, 12' are minimized.

With respect to the FIG. 1 embodiment 10, the contaminant separator 58 and water-control loop 78 of the present disclosure also include a method of decontaminating a fuel reactant stream for the fuel cell 12. The method includes the steps of flowing the fuel reactant stream adjacent surfaces of ammonia dissolving media 61 within a fluidized bed 62 within a separator scrubber 58 while simultaneously flowing water over the surfaces of the ammonia dissolving media 61 within the fluidized bed 62 to separate contaminants from the fuel reactant stream into the water; then accumulating the contaminated water that has flowed over the ammonia dissolving media 61 within the fluidized bed 62 within an accumulator 68; circulating the contaminated water through a water-control loop 78 from a water outlet 82 of the scrubber into a water discharge 66 within the scrubber 58 to flow over the surface areas of the fluidized bed 62; while circulating the contaminating water through the water-control loop 78, decontaminating the contaminated water within an ion exchange bed 88 secured in fluid communication with the water-control loop; and, controlling a temperature of the fuel reactant stream flowing through a first section 56 of a fuel reactant stream inlet line 26 secured in fluid communication with the separator scrubber 58 to produce an optimal temperature of the fuel reactant stream passing through the separator scrubber 58. An additional and optional step may include adding an ammonia solubility enhancing reagent to the separated contaminated water stream before the step of removing contaminants from the separated contaminated water stream within the ion exchange bed 88 step. Any reagents that enhance ammonia solubility and that are compatible with the described fluidized bed contaminant separator and water-control loop 78 would be appropriate, such as an appropriate concentration of phosphoric acid or carbonic acid. The carbon dioxide in the reformate fuel stream dissolves in water passing through the separator scrubber 58 thereby forming carbonic acid, which enhances ammonia solubility in the water. By utilizing a cation-only exchange resin to selectively remove the ammonia cations, the dissolved carbon dioxide and carbonic acid anions are allowed to remain in the water and improve the ammonia removal performance of the separator scrubber 58.

In an alternative embodiment, the contaminant separator scrubber 58 and water-control loop 78 of the present disclosure may be utilized to remove contaminants from the fuel flowing out of the reformer means 50 for reforming a hydrogen containing fuel into the fuel reactant stream, wherein the fuel reactant inlet line 26 directs the fuel to an alternative hydrogen consuming apparatus (not shown), such as an engine, furnace, etc. In such an embodiment, the disclosure 10 includes the fuel reformer means 50, the ammonia dissolving media 61, the water-control loop 78 and components associated therewith and described above, and wherein the fuel reactant inlet line 26 is configured to direct the fuel out of the contaminant separator 58 and into an alternative fuel consuming apparatus (not shown).

It can be seen that the fluidized bed contaminant separator and water-control loop 10 for a fuel reactant stream of a fuel cell 12 substantially enhances the efficiencies over known apparatus and methods for removing contaminants from a fuel reactant stream. As recited above, by first separating the contaminants from the reactant stream into the separated contaminated water stream and then isolating and concentrating the contaminants within the ion exchange bed 88, the present disclosure dramatically minimizes the complexities of decontaminating a fuel cell reactant stream. Instead of decontaminating the reactant stream through one large, complex apparatus that must be serviced frequently, the present disclosure permits relatively free flow of the reactant fuel through the scrubber and then concentrates and isolates contaminants. By cycling a water stream through the water-control loop 78 to be de-contaminated within the ion exchange bed 88 and to then pass repeatedly over the fluidized bed 62, the present disclosure provides an efficient concentration of the isolated contaminants within the ion exchange bed 88 for periodic removal from the bed 88 at predetermined intervals to thereby minimize overall costs and maintenance requirements.

While the present disclosure has been disclosed with respect to the described and illustrated fluidized bed contaminant separators and water-control loops 10 and 200 it is to be understood that the disclosure is not to be limited to those alternatives and described embodiments. For example, while an electrolyte 18 having phosphoric acid is known to be detrimentally affected by ammonia contamination and is therefore a likely form of fuel cell 12 to benefit from this disclosure, the disclosure also will be of substantial advantage to and appropriate for fuel cells with other known electrolytes, as well as to other energy consuming apparatus. Accordingly, reference should be made primarily to the following claims rather than the forgoing description to determine the scope of the disclosure.

What is claimed is:

1. A fluidized bed contaminant separator and water-control loop for a fuel reactant stream of a fuel cell comprising:

a separator scrubber secured in fluid communication with a fuel reactant inlet line of the fuel cell, the separator scrubber including an ammonia dissolving media disposed within a fluidized bed within a scrubber container of the separator scrubber for dissolving ammonia and removing particulates from the fuel reactant stream into a separated containment stream within the separator scrubber; a water discharge secured adjacent the ammonia dissolving media and configured to discharge water to flow through the ammonia dissolving media; a fuel reactant discharge secured adjacent the ammonia dissolving media and configured to discharge the fuel reactant stream to flow through the ammonia dissolving media; an accumulator secured in fluid communication with the ammonia dissolving media and configured to receive and accumulate a separated contaminant and water stream; and a scrubber fuel outlet secured within the scrubber container and configured to direct flow of the fuel reactant from the ammonia dissolving media and from the separator scrubber back into the fuel reactant inlet line;

a fuel-control heat exchanger secured in heat exchange relationship with the fuel reactant stream upstream of the fuel reactant stream entering the separator scrubber for adding thermal energy to or removing thermal energy from the fuel reactant stream; and, a water-control loop secured in fluid communication with the separator scrubber, the water-control loop including a loop conduit configured to direct the separated contaminant and water stream out of the accumulator from the water outlet; a water-control loop pump secured in fluid communication with the loop conduit for pumping the separated contaminant and water stream through the loop conduit; an ion exchange bed secured in fluid communication with the loop conduit for directing flow of the separated contaminant and water stream through the ion exchange bed and for removing separated contaminants from the water in the stream within the bed; and a loop conduit return line secured in fluid communication between an outlet of the ion exchange bed and water inlet of the separator scrubber for returning decontaminated water from the water-control loop back into the separator scrubber.

2. The fluidized bed contaminant separator and water-control loop for a fuel reactant stream of claim 1, wherein the ion exchange bed includes a cation-only exchange resin.

3. The fluidized bed contaminant separator and water-control loop for a fuel reactant stream of claim 1, further comprising a fuel-control heat exchanger loop for directing flow of a water-based coolant through the fuel-control heat exchanger, the fuel-control heat exchanger loop comprising:
a fuel-control heat exchanger feed line secured in fluid communication between a coolant loop and the fuel-control heat exchanger, the coolant loop including a coolant loop pump for pumping a water-based coolant supplied by a coolant supply through a coolant loop conduit from a coolant plate secured adjacent the fuel cell, through a coolant heat exchanger for removing heat from the coolant, and back to the coolant plate, the fuel-control heat exchanger feed line being secured to the coolant loop conduit upstream from the coolant plate and,
a fuel-control heat exchanger return line secured in fluid communication between the fuel-control heat exchanger and the coolant loop downstream from the coolant plate between the coolant plate and the coolant heat exchanger.

4. The fluidized bed contaminant separator and water-control loop for a fuel reactant stream of claim 1, further comprising a water discharge valve secured in fluid communication with the water-control loop and configured to selectively direct excess water out of the water-control loop.

5. The fluidized bed contaminant separator and water-control loop for a fuel reactant stream of claim 1, wherein the ammonia dissolving media comprises a fluidizable high surface area medium dispersed within the fluidized bed.

6. The fluidized bed contaminant separator and water-control loop for a fuel reactant stream of claim 1, further comprising a controller secured in communication with the fuel reactant stream within the fuel inlet line and configured to:
sense information from the fuel reactant stream;
sense water level information from the accumulator; and
control one or more of the fuel-control heat exchanger and a water discharge valve secured in fluid communication with the water-control loop, in response to the sensed information.

7. The fluidized bed contaminant separator and water-control loop for a fuel reactant stream of claim 1, further comprising a scrubber outlet gas re-heater loop, the scrubber outlet gas re-heater loop comprising:
a gas re-heater loop conduit secured in fluid communication with a coolant loop, the coolant loop including a coolant loop pump configured to pump a coolant through a coolant loop conduit from a coolant plate secured adjacent the fuel cell, through a coolant heat exchanger configured to remove heat from the coolant, and back to the coolant plate, the gas re-heater loop conduit being configured to direct flow of the coolant from the coolant loop upstream from the coolant heat exchanger and back into the coolant loop; and
a scrubber outlet gas heat exchanger secured in fluid communication with the gas re-heater loop conduit and configured to direct flow of the coolant in heat exchange relationship with fuel passing within the fuel reactant inlet line between the separator scrubber and the fuel cell to heat the fuel.

8. The fluidized bed contaminant separator and water-control loop for a fuel reactant stream of claim 7, wherein the scrubber outlet gas re-heater loop further comprises a shift converter heat exchanger secured in fluid communication with the gas re-heater loop conduit downstream from the scrubber outlet gas heat exchanger, the shift converter heat exchanger being configured to pass the coolant within the gas re-heater loop conduit in heat exchange relationship with a low temperature shift converter secured in fluid communication with the fuel reactant inlet line, to remove heat from the low temperature shift converter.

9. The fluidized bed contaminant separator and water-control loop for a fuel reactant stream of claim 1, wherein the fuel-control heat exchanger is secured in heat exchange relationship with the fuel reactant stream upstream of both the separator scrubber and the water-control loop.

10. A fluidized bed contaminant separator and water-control loop for a fuel reactant stream of a fuel cell, comprising:
a separator scrubber secured in fluid communication with a fuel reactant inlet line of the fuel cell, the separator scrubber including an ammonia dissolving media disposed within a fluidized bed within a scrubber container of the separator scrubber for dissolving ammonia and removing particulates from the fuel reactant stream into a separated containment stream within the separator scrubber; a water discharge secured adjacent the ammonia dissolving media and configured to discharge water to flow through the ammonia dissolving media; a fuel reactant discharge secured adjacent the ammonia dissolving media and configured to discharge the fuel reactant stream to flow through the ammonia dissolving media; an accumulator secured in fluid communication with the ammonia dissolving media and configured to receive and accumulate a separated contaminant and water stream; and a scrubber fuel outlet secured within the scrubber container and configured to direct flow of the fuel reactant from the ammonia dissolving media and from the separator scrubber back into the fuel reactant inlet line;
a fuel-control heat exchanger secured in heat exchange relationship with the fuel reactant stream upstream of the separator scrubber for adding thermal energy to or removing thermal energy from the fuel reactant stream; and
a water-control loop secured in fluid communication with the separator scrubber, the water-control loop including a loop conduit configured to direct the separated contaminant and water stream out of the accumulator from the water outlet; a water-control loop pump secured in fluid communication with the loop conduit for pumping the separated contaminant and water stream through the loop conduit; an ion exchange bed secured in fluid communication with the loop conduit for directing flow of the separated contaminant and water stream through the ion exchange bed and for removing separated contaminants from the water in the stream within the bed; and a loop conduit return line secured in fluid communication between an outlet of the ion exchange bed and a water inlet of the separator scrubber for returning decontaminated water from the water-control loop back into the separator scrubber; and a scrubber outlet gas re-heater loop, the scrubber outlet gas re-heater loop comprising:

a gas re-heater loop conduit secured in fluid communication with a coolant loop, the coolant loop including a coolant loop pump configured to pump a coolant through a coolant loop conduit from a coolant plate secured adjacent the fuel cell, through a coolant heat exchanger configured to remove heat from the coolant, and back to the coolant plate, the gas re-heater loop conduit being configured to direct flow of the coolant from the coolant loop upstream from the coolant heat exchanger and back into the coolant loop; and a scrubber outlet gas heat exchanger secured in fluid communication with the gas re-heater loop conduit and configured to direct flow of the coolant in heat exchange relationship with fuel passing within the fuel reactant inlet line between the separator scrubber and the fuel cell to heat the fuel.

11. The fluidized bed contaminant separator and water-control loop for a fuel reactant stream of claim 10, wherein the scrubber outlet gas re-heater loop further comprises a shift converter heat exchanger secured in fluid communication with the gas re-heater loop conduit downstream from the scrubber outlet gas heat exchanger, the shift converter heat exchanger being configured to pass the coolant within the gas re-heater loop conduit in heat exchange relationship with a low temperature shift converter secured in fluid communication with the fuel reactant inlet line, to remove heat from the low temperature shift converter.

* * * * *

UNITED STATES PATENT AND TRADEMARK OFFICE
CERTIFICATE OF CORRECTION

PATENT NO.        : 9,553,323 B2
APPLICATION NO.   : 13/263148
DATED             : January 24, 2017
INVENTOR(S)       : Joshua D. Isom Page 1 of 1

It is certified that error appears in the above-identified patent and that said Letters Patent is hereby corrected as shown below:

In the Claims

In Claim 1, Column 11, Line 15; prior to "water" insert --a--

Signed and Sealed this
Eighteenth Day of April, 2017

Michelle K. Lee
*Director of the United States Patent and Trademark Office*